US007644399B2

(12) United States Patent
Craske et al.

(10) Patent No.: US 7,644,399 B2
(45) Date of Patent: Jan. 5, 2010

(54) FORMING AN EXECUTABLE PROGRAM FROM A LIST OF PROGRAM INSTRUCTIONS

(75) Inventors: Simon John Craske, Cambridge (GB); Eric Jason Furbish, Austin, TX (US); Jonathan William Brawn, Austin, TX (US)

(73) Assignee: ARM Limited, Cambridge (GB)

( * ) Notice: Subject to any disclaimer, the term of this patent is extended or adjusted under 35 U.S.C. 154(b) by 739 days.

(21) Appl. No.: 11/003,018

(22) Filed: Dec. 3, 2004

(65) Prior Publication Data

US 2006/0123402 A1 Jun. 8, 2006

(51) Int. Cl.
*G06F 9/44* (2006.01)
(52) U.S. Cl. ...................... 717/135; 717/136
(58) Field of Classification Search ......... 717/134–135, 717/136–139; 711/202; 703/22
See application file for complete search history.

(56) References Cited

U.S. PATENT DOCUMENTS

| 5,488,573 | A | | 1/1996 | Brown et al. |
| 5,551,015 | A | * | 8/1996 | Goettelmann et al. ....... 717/137 |
| 5,668,969 | A | * | 9/1997 | Fitch ........................... 711/202 |
| 5,913,064 | A | | 6/1999 | Chen |
| 6,349,393 | B1 | * | 2/2002 | Cox ............................. 714/38 |
| 6,397,379 | B1 | * | 5/2002 | Yates et al. ................... 717/140 |
| 7,089,534 | B2 | * | 8/2006 | Hartman et al. .............. 717/125 |
| 2002/0083421 | A1 | * | 6/2002 | Simons ........................ 717/140 |
| 2003/0167292 | A1 | * | 9/2003 | Ross ............................ 709/101 |
| 2004/0015791 | A1 | | 1/2004 | Smith et al. |
| 2005/0102572 | A1 | * | 5/2005 | Oberlaender .................. 714/29 |

FOREIGN PATENT DOCUMENTS

EP 0 628 911 12/1994

OTHER PUBLICATIONS

M. Bose et al, "A Genetic Approach to Automatic Bias Generation for Biased Random Instruction Generation" Evolutionary Computation 2001, May 2001, pp. 442-448.
M. Bose et al, "Automatic Bias Generation Using Pipeline Instruction State Coverage for Biased Random Instruction Generation" On-Line Testing Workshop 2001, Jul. 2001, pp. 65-71.

* cited by examiner

*Primary Examiner*—Ted T Vo
*Assistant Examiner*—Junchun Wu
(74) *Attorney, Agent, or Firm*—Nixon & Vanderhye P.C.

(57) ABSTRACT

A list of program instructions are mapped into memory addresses to form an executable program by simulating their execution in turn so as to determine a memory address of a next program instruction to be executed. That memory address is then examined to determine if a program instruction has already been mapped thereto. If the memory address is empty, then the next program instruction from the list is mapped to that empty memory address and the execution of that next program instruction is simulated and the process repeated. If the memory address is not empty, then the program instruction read from that memory address is simulated again and the process repeated.

18 Claims, 3 Drawing Sheets

FORMING AN EXECUTABLE PROGRAM FROM A LIST OF PROGRAM INSTRUCTIONS

BACKGROUND OF THE INVENTION

1. Field of the Invention

This invention relates to the field of data processing systems. More particularly, this invention relates to mapping program instructions from a list of program instructions into a memory address space to form an executable program.

2. Description of the Prior Art

It is known to generate computer programs in a form in which they can be automatically compiled to form an executable program image. During compilation the computer programs are mapped to memory addresses with branch targets, jump targets and the like being dynamically calculated with appropriate instruction modifications such that the computer program as a whole will execute correctly. Typically, although not always, such computer programs are laid down to form a contiguous program image within the memory space.

Compilers for use in accordance with the above rely upon the computer programs they are to compile being represented in a symbolic and abstract manner, such as assembly language code, such that the compiler can interpret the symbolic representation of the program to generate binary executable program instructions to be stored in the memory. Abstract program representations, such as assembly language, are also easier for most humans writing computer programs to understand and manipulate.

It is also known to produce test programs for the purpose of testing data processing systems by causing them to adopt a broad range of functional states. Such testing can be done for design verification, manufacturing test or other reasons. Such a test program will typically be run or simulated and then the final result compared with an expected result to see if the circuit is behaving as anticipated. The requirements for a test program to execute so as to move the system through a broad range of its possible states places different requirements on the program instructions than are normal. In particular, symbolic representations of the computer program to be used as a test are not really useful since depending upon how these will compile into an executable image the states between which the system will move will vary considerably. One compilation of such a program may produce a suitable test whereas another compilation may not test sufficiently. For this reason, test programs may more desirably be formed in a more specific form in which the various operand values are determined rather than being dynamically selected during compilation. Such programs will behave more predictably and so generate more predictable test behaviour. However, a problem arises in producing executable programs from such test program instructions since a compiler is no longer used and able to deal with the problem of laying out the program instructions into memory and adjusting branches and jumps so that the correct program flow is maintained. This problem is made worse in situations in which it is possible to load the program counter value as this increases the ways in which the program flow can jump and makes such jumps data dependent, e.g. a value is calculated by one instruction and then loaded to the program counter resulting in a jump to the calculated address.

SUMMARY OF THE INVENTION

Viewed from one aspect the present invention provides a method of mapping a list of program instructions into memory addresses to form an executable program, said method comprising:

(i) simulating execution of a program instruction from said list;

(ii) determining a memory address within a memory of a next program instruction to be simulated;

(iii) detecting if said memory address already has a program instruction mapped thereto and:

(a) if said memory address does already have a program instruction mapped thereto, then using said program instruction already mapped to said memory address as said next program instruction; or (b) if said memory address does not already have a program instruction mapped thereto, then using a program instruction from said list as said next program instruction;

(iv) repeating steps (i), (ii) and (iii) using said next program instruction as said program instruction to be simulated in step (i) until all of said program instructions from said list have been mapped to memory addresses.

The present technique is able to map a list of arbitrary program instructions into memory and ensure that the resulting program laid out in memory will execute. Simulation of execution of a program instruction allows the memory address of the next program instruction to be determined and then the next program instruction can be placed at that memory location, wherever that may be. Thus, when a branch, jump or other instruction resulting in non-sequential program flow occurs, the target address is determined at that time and the next program instruction is mapped to that target address.

The simulation of the program instructions could be performed in a variety of different ways and at a minimal level need only determine the address of the next instruction to be executed rather than the entire next state of the system. However, it is convenient to use an instruction set simulator to perform the simulation of execution.

The list of program instructions to be mapped to memory addresses could be an arbitrary list of independent program instructions, but more typically will be an ordered list of program instructions, in which case the instructions are read out to be laid down in memory from that list in accordance with the predetermined ordering.

Whilst the present technique could be used for lists of program instructions having a variety of purposes, it is particularly well suited for situations in which the program instructions form part of a test program. The present technique will tend to spread the program instructions widely across the memory image space and whilst this might normally be thought to be problematic, in the context of testing the system such a spread of program across memory space is unlikely to be difficult, since other programs are not likely to be running, and indeed may be beneficial in some circumstances.

In some data processing systems certain memory addresses are not generally available for program instructions from the list. Examples of such memory addresses would be those reserved for interrupt vector tables, entries in a stack memory, memory mapped devices and the like. For such sensitive memory addresses as these may be protected and when it is detected that the mapping is seeking to place a program instruction as such a memory address, then the mapping process may be aborted as such a mapping would not in practice be satisfactory. As an alternative, the last instruction could be unwound and an alternative instruction placed and simulated to see if the problem could be avoided.

Whilst it is possible that the list of program instructions to be mapped may be predetermined and static, in other embodiments the program instruction list may be dynamically being added to, or otherwise altered during the mapping process. As an example, the list of program instructions could be generated by a genetic algorithm serving to evolve a test program and reusing the simulation of the execution of the program instructions in guiding the evolution of the test program.

Whilst it will be appreciated that the mapping of program instructions to the memory may be performed independently of actually storing those program instructions to such memory addresses, if the program instructions are stored to corresponding memory addresses when the mapping is made, then at the end of the mapping process, the memory will contain an image of the executable program. This may be advantageous as it may then be directly converted into some other desired form, such as a compressed representation.

Data values to be consumed in the simulated execution are initialised with quasi random values that are recorded such that the same value can be used when it is desired to run the resulting executable program.

Viewed from another aspect the present invention provides apparatus for processing data operable to map a list of program instructions into memory addresses to form an executable program, said apparatus comprising logic operable to perform the steps of:

(i) simulating execution of a program instruction from said list;

(ii) determining a memory address within a memory of a next program instruction to be simulated;

(iii) detecting if said memory address already has a program instruction mapped thereto and:

(a) if said memory address does already have a program instruction mapped thereto, then using said program instruction already mapped to said memory address as said next program instruction; or (b) if said memory address-does not already have a program instruction mapped thereto, then using a program instruction from said list as said next program instruction;

(iv) repeating steps (i), (ii) and (iii) using said next program instruction as said program instruction to be simulated in step (i) until all of said program instructions from said list have been mapped to memory addresses.

Viewed from a further aspect the present invention provides a computer program product bearing a computer program for controlling a computer to perform a method of mapping a list of program instructions into memory addresses to form an executable program, said method comprising:

(i) simulating execution of a program instruction from said list;

(ii) determining a memory address within a memory of a next program instruction to be simulated;

(iii) detecting if said memory address already has a program instruction mapped thereto and:

(a) if said memory address does already have a program instruction mapped thereto, then using said program instruction already mapped to said memory address as said next program instruction; or (b) if said memory address does not already have a program instruction mapped thereto, then using a program instruction from said list as said next program instruction;

(iv) repeating steps (i), (ii) and (iii) using said next program instruction as said program instruction to be simulated in step (i) until all of said program instructions from said list have been mapped to memory addresses.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
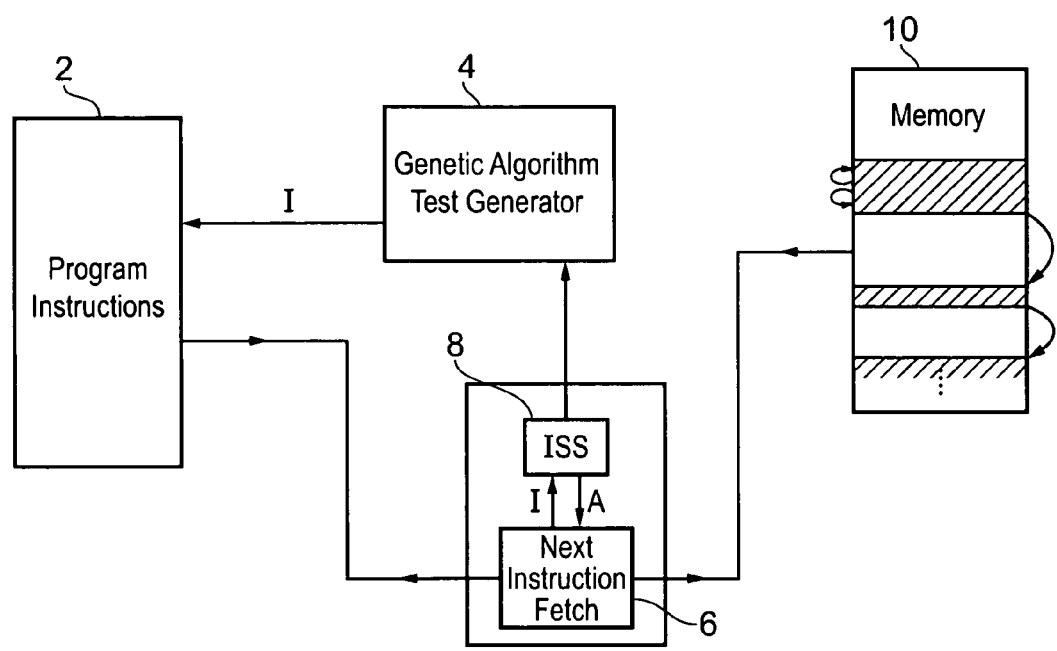
FIG. 1 schematically illustrates a system for mapping program instructions to memory addresses.

FIG. 1 illustrates a list of program instructions 2. This may be a list of 32-bit binary executable program instructions, such as have been produced by a genetic algorithm test generator 4. It will be appreciated that the program instructions could take a wide variety of different forms and are not limited to those described above.

A next instruction fetch unit 6 provides a next instruction to be simulated This instruction is provided as a next instruction to an instruction set simulator 8. The instruction set simulator 8 determines the functional state of a simulated data processing system following execution of that program instruction, including determining what will be the next program counter PC value following such execution. The instruction set simulator 8 can feedback this state information into the genetic algorithm test generator 4 to guide this in its mutation and evolution operations. The program counter value PC can be loaded to by at least some instructions using a calculated data value. This can cause program flow jumps which also need to be tracked.

If the simulated instruction consumes as an input an initialised (not already seeded, calculated or otherwise defined) then a quasi random data value is supplied. The value is recorded such that the executable program resulting when the program instructions are mapped to memory can be seeded with the same data values such that execution will follow the same path. Data is mutable so it is significant that it is the initialising value of an input that should be recorded.

The memory address of the next instruction to be executed is returned from the instruction set simulator 8 as a value A to the next instruction fetch unit 6. The next instruction fetch unit 6 then examines this memory location within a memory 10 to determine if that memory location is empty or already contains a program instruction. If the location already contains a program instruction, then that program instruction is read from the memory location and passed to the instruction set simulator 8 as the next program instruction to be simulated.

If the memory address within the memory 10 is empty, then a next program instruction within the ordered list of program instructions 2 is read by the next instruction fetch unit 6 and stored into that memory location in the memory 10 as well as being supplied to the instruction set simulator 8 to be simulated.

The next instruction fetch unit 6 starts with the first instruction from the list of program instructions 2 and thereafter takes either the next instruction from the list or from the memory 10 when available.

The next instruction fetch unit 6 also determines when the last program instruction from the ordered list of program instructions 2 has been read and mapped to the memory 10, at which point the mapping process is complete.

Figure 2:
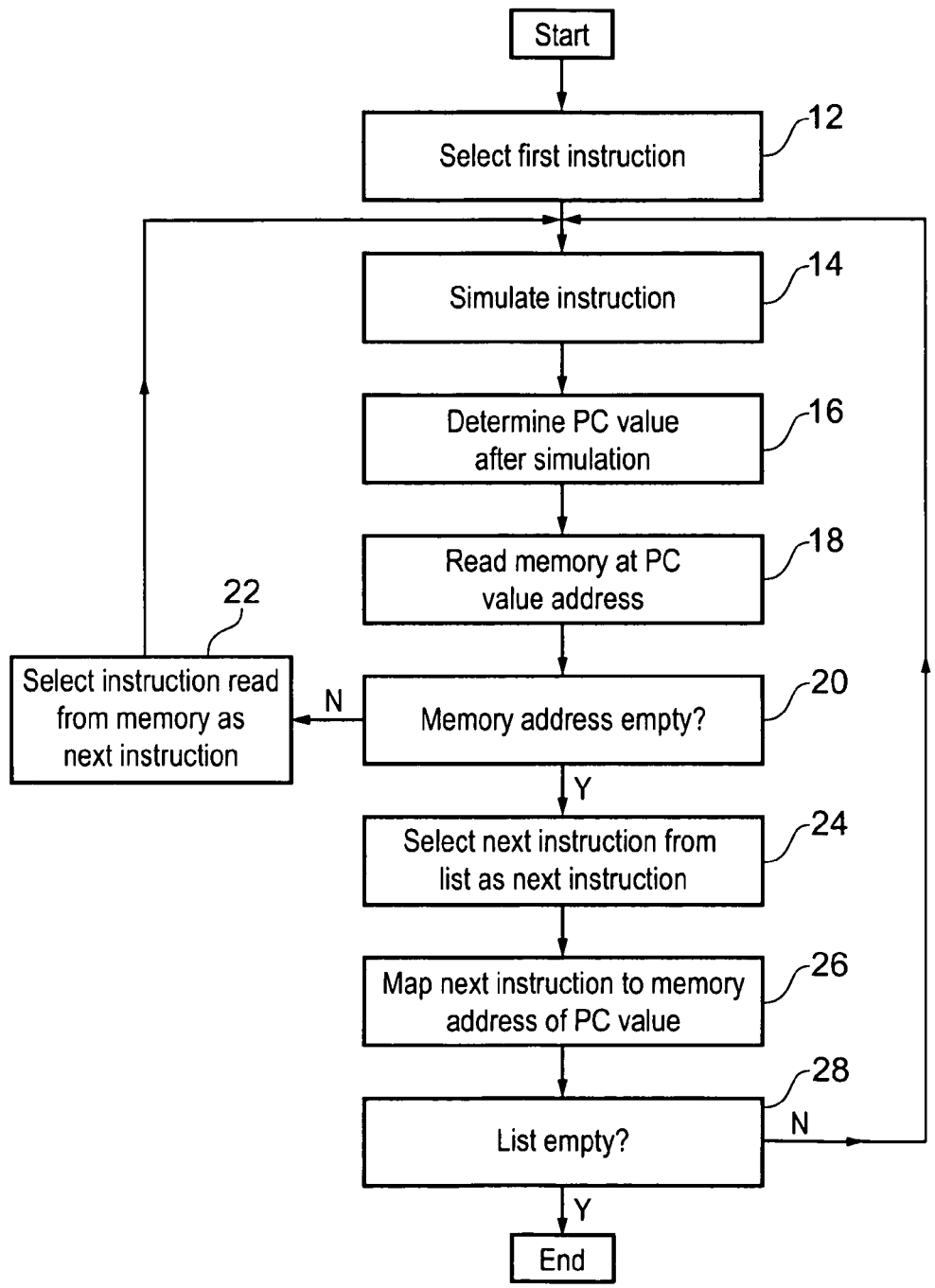
FIG. 2 is a flow diagram schematically illustrating a method of mapping program instructions to memory addresses.

FIG. 2 is a flow diagram schematically illustrating the mapping process. At step 12 the first instruction from the list of program instructions is selected. At step 14 the execution of this instruction is simulated, including at least the determination of the program counter PC value after that simulation at step 16.

Step 18 reads the memory at the PC value address and recovers what is stored therein. Step 20 then determines whether that memory address is empty. The memory 10 is initialised to an empty state to ensure that memory addresses to which program instructions have not already been mapped will return empty values.

If the determination at step 20 was that the memory address is not empty, then step 22 selects the instruction read from that memory address as the next instruction and supplies this to the instruction set simulator 8 and returns processing to step 14.

If the determination at step 20 was that the memory address accessed is empty, then step 24 selects the next instruction from the ordered list of program instructions 2. This next instruction is then mapped to the memory address of the PC value used at step 18 and stored therein at step 26. Step 28 determines if the list of program instructions 2 is empty. If the list is not empty, then the instruction which was selected at step 24 is supplied to the instruction set simulator 8 as the next instruction set simulator 8 as the next instruction to be simulated at step 14 and processing is returned to step 14. If the list is empty, then the mapping process terminates.

Figure 3:
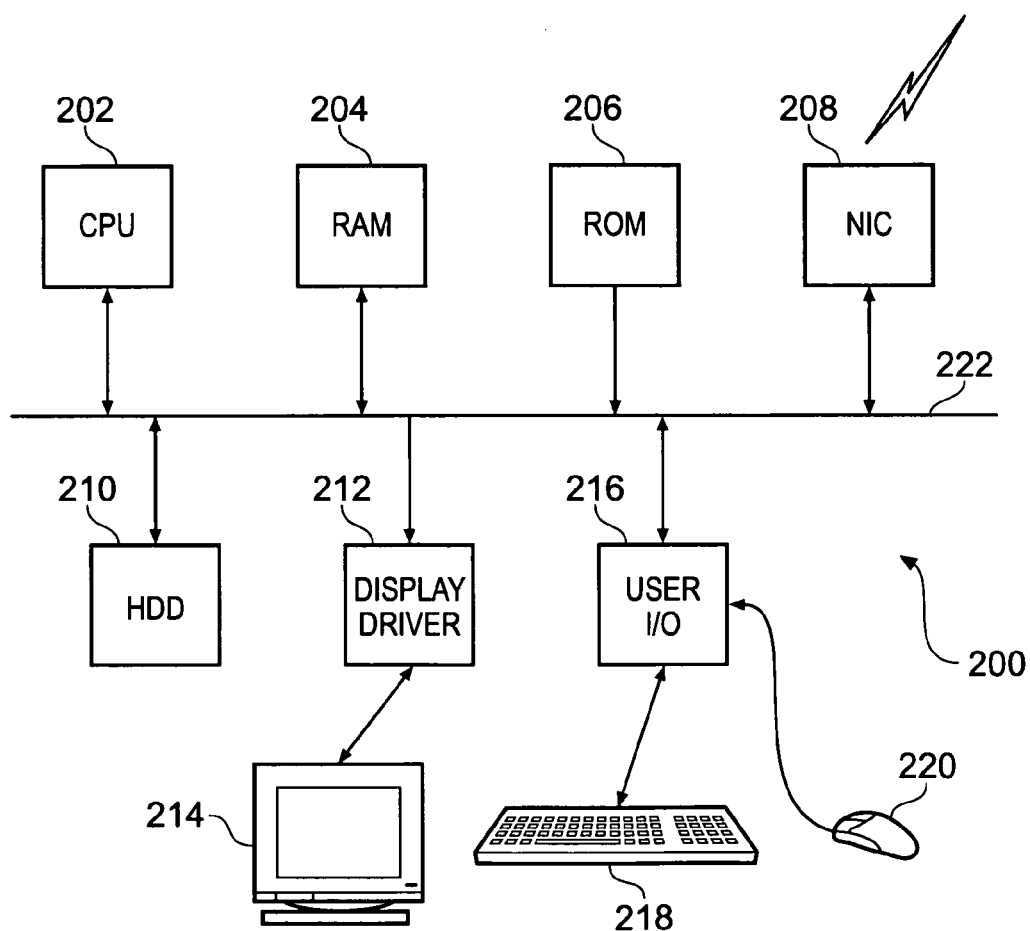
FIG. 3 schematically illustrates a general purpose computer of the type which may be used to implement the current techniques.

FIG. 3 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 3 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of mapping a list of program instructions into memory addresses to form an executable program, said method comprising:
 (i) simulating execution of a program instruction from said list;
 (ii) determining a memory address within a memory of a next program instruction to be simulated;
 (iii) detecting if said memory address already has a program instruction mapped thereto and:
  (a) if said memory address does already have a program instruction mapped thereto, then using said program instruction already mapped to said memory address as said next program instruction; or
  (b) if said memory address does not already have a program instruction mapped thereto, then using a program instruction from said list as said next program instruction;
 (iv) repeating steps (i), (ii) and (iii) using said next program instruction as said program instruction to be simulated in step (i) until all of said program instructions from said list have been mapped to memory addresses.

2. A method as claimed in claim 1, wherein simulating execution of said program instruction is performed by an instruction set simulator.

3. A method as claimed in claim 1, wherein said list of program instructions is an ordered list of program instructions and said step (iii) (b) reads program instructions in sequence from said ordered list for use as said next instruction.

4. A method as claimed in claim 1, wherein said executable program is a test program for testing operation of a data processing apparatus.

5. A method as claimed in claim 1, wherein said list of program instructions is an automatically generated list of program instructions.

6. A method as claimed in claim 1, wherein said program instructions are binary executable program instructions.

7. A method as claimed in claim 1, further comprising detecting if said memory address corresponds to a protected memory address in to which program instructions are not to be mapped and if so aborting said method of mapping.

8. A method as claimed in claim 7, wherein said protected memory address corresponds to one of:
 an entry in an interrupt vector table;
 a memory mapped device; and
 an entry in a stack memory.

9. A method as claimed in claim 7, wherein said list is added to whilst said method of mapping progresses.

10. A method as claimed in claim 5, wherein said step of simulating is used as part of controlling automatic generation of said list.

11. A method as claimed in claim 10, wherein said automatic generation of said list uses genetic algorithms to evolve a test program for a data processing apparatus.

12. A method as claimed in claim 1, wherein when a program instruction is mapped to a memory address, said program instruction is stored at said memory address such that when all program instructions from said list have been mapped said memory contains an image of an executable program.

13. A method as claimed in claim 1, wherein said program instructions include at least one instruction operable to load a data value to a program counter register thereby resulting in a jump in execution point to a program instruction stored at a memory location indicated by said data value.

14. A method as claimed in claim 1, wherein when simulating execution of a program instruction having an uninitialised data value as an input, selecting an initialising data value as said input as simulating execution using said initialising data value.

15. A method as claimed in claim 14, wherein selection of said initialising data value comprises selecting a quasi random initialising data value.

16. A method as claimed in claim 14, wherein said initialising data value is recorded such that corresponding initialising data values can be provided when said executable program is to be executed.

17. Apparatus for processing data operable to map a list of program instructions into memory addresses to form an executable program, stored on a computer redable storage medium, said apparatus comprising logic operable to perform the steps of:
- (i) simulating execution of a program instruction from said list;
- (ii) determining a memory address within a memory of a next program instruction to be simulated;
- (iii) detecting if said memory address already has a program instruction mapped thereto and:
  - (a) if said memory address does already have a program instruction mapped thereto, then using said program instruction already mapped to said memory address as said next program instruction; or
  - (b) if said memory address does not already have a program instruction mapped thereto, then using a program instruction from said list as said next program instruction;
- (iv) repeating steps (i), (ii) and (iii) using said next program instruction as said program instruction to be simulated in step (i) until all of said program instructions from said list have been mapped to memory addresses.

18. A computer program product comprising a computer readable storage medium containing computer readable instructions for controlling a computer to perform a method of mapping a list of program instructions into memory addresses to form an executable program, said method comprising:
- (i) simulating execution of a program instruction from said list;
- (ii) determining a memory address within a memory of a next program instruction to be simulated;
- (iii) detecting if said memory address already has a program instruction mapped thereto and:
  - (a) if said memory address does already have a program instruction mapped thereto, then using said program instruction already mapped to said memory address as said next program instruction; or
  - (b) if said memory address does not already have a program instruction mapped thereto, then using a program instruction from said list as said next program instruction;
- (iv) repeating steps (i), (ii) and (iii) using said next program instruction as said program instruction to be simulated in step (i) until all of said program instructions from said list have been mapped to memory addresses.

* * * * *